United States Patent

Peterson

[15] 3,637,390
[45] Jan. 25, 1972

[54] PHOTOGRAPHIC MEDIUM CONTAINING AN ALIPHATIC AMINE STABILIZER

[72] Inventor: John O. H. Peterson, Cape Elizabeth, Maine

[73] Assignee: Scott Paper Company, Delaware County, Pa.

[22] Filed: Dec. 19, 1969

[21] Appl. No.: 886,738

[52] U.S. Cl. ................................................96/90, 96/48
[51] Int. Cl. ...........................................................G03c 1/72
[58] Field of Search ..........................................96/90, 48

[56] References Cited

UNITED STATES PATENTS

| | | | |
|---|---|---|---|
| 3,394,392 | 7/1968 | Mattor | 96/90 |
| 3,394,393 | 7/1968 | Mattor et al. | 96/90 |
| 3,394,394 | 7/1968 | Mattor et al. | 96/90 |
| 3,394,395 | 7/1968 | Mattor et al. | 96/90 |

Primary Examiner—Norman G. Torchin
Assistant Examiner—Richard E. Fichter
Attorney—John A. Weygandt, William J. Foley, John W. Kane, Jr. and Martin L. Faigus

[57] ABSTRACT

In a photographic medium containing a furfurylidene, an aromatic amine enhancer system and a lower haloalkane sensitizer, the improvement comprising adding an aliphatic amine to the aromatic amine enhancer system.

7 Claims, No Drawings

PHOTOGRAPHIC MEDIUM CONTAINING AN ALIPHATIC AMINE STABILIZER

RELATED APPLICATIONS

This application is an improvement on the basic processes and products described and claimed in U.S. Pat. No. 3,394,395, entitled "Photosensitive Medium Comprising a Furfurylidene, A primary Aromatic Amine and A Lower Haloalkane," issued July 23, 1968; U.S. Pat. No. 3,394,394, entitled "Photographic Medium Based On 5-Halo Furfurylidenes," issued July 23, 1968; U.S. Pat. No. 3,394,392, entitled "Photographic Plate Based on Furfurylidene and Using Polyphenylene Oxide Resin Binder," issued July 23, 1968; U.S. Pat. No. 3,394,393, entitled "Photographic Mediums Based on Furfurylidenes with 1-Chloro-2,3-Phenylenediamine Enhancer," issued July 23, 1968 and copending application Ser. No. 746,254, entitled "Photographic Media Containing an Improved Amine Enhancer System," filed July 22, 1968. The disclosures and teachings of the aforesaid patents and application are hereby expressly incorporated by reference.

BACKGROUND OF THE INVENTION

The parent applications describe a photographic medium comprised of a furfurylidene derivative, a primary aromatic amine enhancer and a lower haloalkane sensitizer. The primary aromatic amine enhancer is described as a primary aromatic amine preferably containing two primary amino groups, each of which is in resonance with a benzene ring and more preferably, an amine in which these amino groups are positioned meta to each other on the same benzene ring. The amines are further characterized as having up to two other functional groups on the ring but preferably only one, with a functional group adjacent an amino group. Specific amine compounds include 2,6-dichloro-p-phenylenediamine; 2-chloro-p-phenylenediamine; p-hydroxyaniline; m-phenylenediamine; 4-halo-m-phenylenediamines; 4-methoxy-m-phenylenediamine; 2,4-toluenediamine; 4-ethyl-m-phenylenediamine; benzidine 3,3'-dimethoxy benzidine; 4-phenoxy-m-phenylenediamine; 4,4'-dianilines; etc., with the m-phenylenediamine, mono-substituted-m-phenylenediamines; 2,4-toluenediamine; 4,4'-dianilines and benzidines giving the best results. 4-Chloro-m-phenylenediamine is one of the preferred amines; producing a photographic medium which when applied to a flexible substrate has a shelf life at room temperature of about six weeks. Also included in the group of primary aromatic amines are mixtures containing at least one member of the group of primary aromatic amines consisting of m- or p-phenylenediamines, mono- or di-substituted m- or p-phenylenediamines; aniline, N-phenyl-p-phenylenediamine; 4,4'-methylenedianiline; 4,4'-thiodi-aniline; benzidines or substituted benzidines and at least one member of the group of polyhalo-substituted phenylenediamines corresponding to the formula

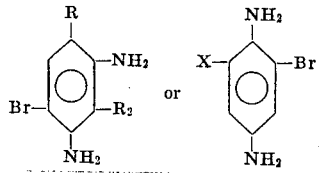

wherein, in the present specification and claims, R represents bromine, chlorine, methyl, ethyl or isopropyl; $R_2$ represents bromine of hydrogen and X represents bromine or chlorine. When one member of the mixture is 2,6-dibromo-p-phenylenediamine or 2-chloro- 6-bromo-p-phenylenediamine, it must be employed in conjunction with at least one other member selected from either group but said other member, if only one other member is employed, it is not to be either 2,6-dibromo-p-phenylenediamine or 2-chloro-6-bromo-p-phenylenediamine. The 2,6-dibromo-p-phenylenediamine and 2-bromo- 6-chloro-p-phenylenediamine are unique in that they are the only compounds which can be employed as a member of either group. However, as previously stated, they must be employed in conjunction with at least one other member of either group as the desired increased shelf life, image stability and unique image optical density are not obtained unless employed in such a mixture.

The terms mono- or di-substituted m- or p-phenylenediamines refer to monohalo-m- or p-phenylenediamines, dichloro-phenylenediamines, mono-halo-monomethyl-phenylenediamines, mono-halo-monoethyl-phenylenediamines; methoxy-phenylenediamines, ethoxy-phenylenediamines; 2-bromo-6-chloro-p-phenylenediamine or 2,6-dibromo-p-phenylenediamines. The term "substituted benzidines" refers to 3,3'-dimethoxy or 3,3'-diethoxybenzidenes.

Shelf life of a photographic film or medium is very important as long periods of time often elapse between the production of the film and its use. It has been discovered that the photographic media containing a primary aromatic amine tend to develop irregular areas of discoloration after about 6 weeks in storage at room temperature in the dark. The areas of discoloration are believed to be due to the activation of the photographic medium. Photographic media containing primary aromatic amines become prematurely activated in less than 6 weeks. While the film bearing the photographic medium that has become prematurely activated can be imaged, developed and fixed, the imaging characteristics are altered unpredictably and the background areas remain permanently discolored. Thus the premature activation of the photographic medium is highly undesirable. Unique aliphatic amine stabilizers have been discovered which when used in combination with the primary aromatic amine enhancers of the previously described systems result in photographic mediums having lengthened shelf life periods of up to five fold or greater without discoloration.

It is a further advantage of the present invention that when the photographic media are prepared utilizing an increased proportion of polyphenylene oxide as the resinuous binder, a synergistic effect between the polyphenylene oxide binder and the aliphatic/aromatic amine system is achieved which gives up to a ten fold increase in shelf life of the exposed medium.

The photographic media of the invention produce images which are black, gray or dark brown over the entire exposure range, particularly, when employing the m-phenylenediamines described in Ser. No. 746,254. In the past those enhancers most acceptable in respect to shelf life tended to produce images more brownish than black. Moreover, the tendency in many cases has been for the image to vary in hue depending upon the degree of exposure. It has been possible to produce black images in such cases by adding an auxiliary enhancer to the mono-substituted enhancer generally employed, but previously used auxiliaries have invariably undesirably shortened the shelf life of the photographic medium.

Other advantages of the present invention will readily become apparent.

DESCRIPTION OF THE INVENTION

The present invention is directed to a new and improved aliphatic/aromatic amine system to be employed in the production of photographic media. More particularly, the present invention is directed to a new aliphatic/aromatic amine system to be employed in conjunction with a furfurylidene derivative color former and a lower haloalkane sensitizer.

As previously indicated, the basic photographic medium containing aromatic amine enhancers as previously described in U.S. Pat. Nos. 3,394,392; 3,394,393; 3,394,394; 3,394,395 and copending U.S. Pat. application Ser. No. 746,254 is improved by the addition of the unique aliphatic amine stabilizers of the present invention. The teachings of these patents and the copending application are hereby expressly incorporated by reference.

The photographic medium upon which the present invention is an improvement consists essentially of a furfurylidene derivative as the color-forming ingredient, a primary aromatic amine enhancer system and a lower haloalkane sensitizer. The photographic medium is negative working and is usually carried as a film on an impervious flexible support.

In the present specification and claims, the term "furfurylidene derivative" refers to color-forming furfurylidene compounds and preferably furfurylidene derivatives corresponding to one of the formulas:

I
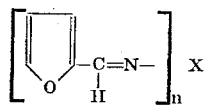

or

II
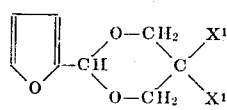

wherein n is 1 or 2, with X, when n is 1, being a hydroxyl amino, phenyl or naphthyl radical and when n is 2, being absent or a phenylene, naphthylene of 4,4'-biphenylene radical; and X' is a methyl, nitro or furfurylidene imine radical or a carbon atom forming a part of a cyclic acetal ring with the other X' to give a difurfurylidene pentaerythritol.

The furfurylidene derivative is prepared in accordance with known procedures by reacting furfural with, for example, an amine or polyol. The reaction product is purified, and admixed with a solvent and the other ingredients of the photographic medium to prepare a coating solution. The coating solution is applied to a suitable support such as coated paper and dried to leave the photographic medium in the form of a dry film which is photosensitive. A print is made by exposing the film through a photographic negative to light, followed by heating of the exposed film to a temperature greater than 100° C. to develop the image.

Preferably the sensitizer employed in the photograhic medium is a solid at room temperature having a purity of at least 98 percent with compounds containing one to two carbon atoms being preferred. Representative preferred compounds are iodoform and pentabromoethane. Iodoform is most preferred. However, carbon tetrabromide and pentabromoethane have been satisfactorily employed.

As employed in the present specification and claims, the term aliphatic amine refers to menthanediamine, straight and branched chain aliphatic primary, secondary and tertiary amines containing at least six carbon atoms, cyclic aliphatic amines, and cyclic aliphatic amines containing two-ring nitrogen atoms. The primary, secondary and tertiary aliphatic amines correspond to the formula

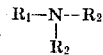

wherein $R_1$ represents a straight or branched chain alkyl moiety containing from three to 24 carbon atoms; $R_2$ independently represents hydrogen or an alkyl group containing from one to 12 carbon atoms and $R_3$ independently represents $R_2$ with the total number of carbon atoms in $R_1$, $R_2$ and $R_3$ adding up to at least six. Representative cyclic aliphatic amines containing two nitrogens include piperizine. Representative primary, secondary and tertiary aliphatic amines include tributylamine; N,N-dimethylbutylamine; N,N-diethyl-pentylamine; trihexylamine; N-methyl-N-octyldecylamine; dioctylamine; didodecylamine; N-ethyl-N,N-dihexylamine; decylamine; dodecylamine; nonadecylamine; N-methylnonadecylamine; N,N-dimethyl-(3-propyl-pentadecylamine); heptylamine; N,N-diethylhexylamine; trihexylamine; N-ethyloctylamine; N,N-diethyloctylamine; tetracosylamine; N,N-diethyldocosylamine; N-butyl-N-ethylhexylamine; ditertiarybutylamine; triisopropylamine; diisopropylamine; N-hexyl-N(5-ethyloctylamine); cyclohexylamine; N-methylcyclohexylamine; p-dicyclohexylamine; triheptylamine; N,N-didecyloctylamine; N-n-propyl-N,N-diethylamine; N-methyl-N-pentylamine; N,N-dimethylpentylamine and N-methylhexylamine.

In producing the unique aliphatic/aromatic amine system of the present invention the primary aromatic amines or mixtures thereof comprise from about 85 to 99.5 percent by weight of the total aliphatic/aromatic amine system with the aliphatic amines or mixtures thereof making up the complementary portion of the aliphatic/aromatic amine system, i.e., from about 0.5 to 15 percent by weight. In general, shelf life of the photographic medium increases as the proportion of the aliphatic amine increases up to about 15 percent.

In the preparation of photographic films and other photosensitive products, the furfurylidene color former, the aliphatic/aromatic amine system and the haloalkane sensitizer are dissolved in solvent solution along with a film-forming plastic polymer to form a coating composition which is applied to a suitable support material. Upon drying, the coating compositions become photosensitive. Any one of several suitable organic solvents that are volatile at room temperature or at slightly elevated temperatures such as chloroform, benezene, 1,1,2-trichloro-ethane and methyl-ethyl ketone can be employed as a solvent for the binder and photographic medium. Mixtures of the solvents can be used to obtain improved solvation. The film-forming plastic should be essentially nonreactive with the other ingredients of the solution and desirably by itself forms a translucent or transparent film that is colorless or substantially colorless so as not to interfere with or mask the color produced by the other ingredients in the photographic medium. Some polyester polymers have been found to be unsatisfactory presumably because the hydrogen halide attacks the ester linkage. The hydrogen halide is believed to be an important intermediate in the chemistry of the dye-formation reactions. Polymers containing large amounts of hydroxyl groups will usually interfere with image formation. The polymer should be unaffected by anhydrous iodide at 75° F. In most cases it is desirable for the polymer to form a nontacky film. Polymer film-formers or binders that are suitable for use in photographic media of the present invention include polysulfone, polystyrene and polyphenylene oxide.

The weight ratio of aliphatic/aromatic amine to the furfurylidene color former is usually in the range of 0.1 to 10, preferably 0.5 to 1.5. The weight ratio of haloalkane sensitizer to color former is in the range of 0.1 to 20, preferably 0.5 to 2. The weight ratio of resin to color former is not too important. It will usually be in the range of 1 to 40, with the lower ratios below about 5 being preferred from the standpoint of intensity and economics. The coating solids used will normally be in the range of 10 to 20 weight percent.

In order to achieve the synergistic effect when employing the unique aliphatic/aromatic amine system of the present invention with polyphenylene oxide resin, the polyphenylene oxide resin is employed in a weight ratio of from 2.5 to 10 with respect to the aliphatic/aromatic amine system. The most marked synergistic effects have been demonstrated using aliphatic-aromatic amine system comprised of menthane diamine and 4-chloro-m-phenylenediamine with the following furfurylidene color formers being preferred: difurfurylidene pentaerythritol, furfurylidene 2-nitro-2-methylpropanediol and difurfurylidene 2-amino-2-methylpropanediol.

A photographic plate or film is prepared from the coating solution by applying it to a suitable support by a conventional means. The coating weight applied (dry basis) will normally be in the range of 2 to 10 pounds per ream (25×38—500 sheets) to give a film thickness in the range of 0.05 to 0.5 mils. The thicker the film, the more intense the image; however, if the film is too thick, it is difficult to fix the background. The film thickness desired will be dependent upon the vapor pressures of the amines employed and the particular resin employed.

The support used in the preparation of a photographic product can have a suitable coated surface to withstand the penetration of organic solvents. In the case of paper, starch, potassium polyacrylate resins, polyvinyl alcohol, and similar binders are employed to produce the barrier coat. In general, film-forming water-soluble resins can also be employed to produce the barrier coat; however, casein and other proteinaceous resins have been found to be detrimental to the photographic medium when said resins are employed in the barrier coat. In the case of transparent supports, films of polyethylene terephthalate resin (DuPont's Mylar) have proved to be excellent supports and particularly suitable for the preparation of films of microphotographic copying. Materials such as cellophane are not usable except under special conditions because of the plasticizer present. Uncoated thin paper sheets, such as a carbonizing paper, can also be impregnated with the solutions to give a translucent appearing product or sheet.

EXAMPLES

The following examples illustrate the desirable photographic characteristics exhibited by photographic media containing the amine enhancer system of the present invention: (These examples are merely illustrative and are not deemed to be limiting).

EXAMPLE 1

A web of bleached paper bodystock having a basis weight of 45 pounds per ream (25×38—500) was base coated with 15 pounds per ream of a coating composition containing, by dry weight, 12 parts of ammonia-cut casein, 14 parts of precipitated calcium carbonate, 86 parts of a No. 1 quality domestic paper-coating clay, 8 parts of a styrene-butadiene latex, one-half part of tetrasodiumpyrophosphate as a dispersant, and one-half part of potassium oleate as a release agent, with sufficient water to bring the total solids to 50 percent.

This coating composition was applied to one side of a web of the above-described bodystock by means of an air knife coater, and dried by conventional means.

The resultant coated paper had a basis weight of 60 pounds per ream. To provide a continuous film for proper solvent holdup an intermediate coating composition was prepared, comprised of 25 parts (wet weight) of an aqueous solution containing 25 percent by weight of a polyvinyl alcohol (Vinol 125 sold by Air Reduction Company), 75 parts of a 50 percent slurry of titanium dioxide (DuPont's RA 50), 1 part of a wetting agent comprised of a premixed combination of 0.5 part of Tergitol NPX and 0.5 part of tributylphosphate and sufficient water to make a 20-percent solids coating composition. Four pounds per ream, dry weight, of this coating composition was applied by means of an air knife coater to the base-coated web. This coating was finished in sequence by conventional supercalendering.

The photographically desirable coated surface thus obtained was topcoated with a photographically sensitive coating composition by means of a No. 20 Mayer bar. The sequence in which dry components are added is not critical in preparing the coatings of the present invention. In a convenient procedure, the top-coating composition was prepared by combining, by dry weight, 1.0 part difurfurylidene pentaerythritol, 0.5 part 4-chloro-m-phenylenediamine, 0.025 part menthanediamine and 1.0-part iodoform.

To these dry components were added as a binder 60 parts (wet weight) polyphenylene oxide resin (General Electric's PPO) which was dissolved in a 10 percent chloroform solution. The entire mixture was stirred until an homogenous composition was obtained.

This coating composition was applied to the coated substrate herein described by No. 20 Mayer bar in an amount equal to 5 pounds per ream dry weight.

After drying, the photographically sensitive sheet thus obtained was exposed through a negative transparency using a 7.5 KVA carbon arc lamp at 24 inches for 60 seconds. Development was effected by heating at 370° F. for 30 seconds.

The positive image thus produced exhibited a high optical density (Dmax of 2.0) in the image areas inverse to the colorless areas of the negative employed for exposure. Sharp, clearly defined contrast was exhibited between the nearly black image areas and the white background areas.

In a further operation conducted as described in example 1, coating compositions were prepared wherein furfurylidene-2nitro--2-propanediol and 3-difurfurylidene-2-amino-2-methylpropanediol were substituted for difurfurylidene pentaerythritol as the sole color former and all other components were unchanged. A clear positive image having high contrast and excellent optical density was obtained when sheets bearing this coating were exposed to a negative and developed. The photographic media thus prepared showed shelf lives of 20 days when stored at 100° F. in the dark. Other photographic media similar in all respects except that the coatings contain no aliphatic amine exhibited shelf life of only three days under the same test conditions.

EXAMPLE 2

In further operations, base sheets were prepared exactly as described in example 1 and coated with a photographic top coating comprising 400-parts difurfurylidene pentaerythritol, 400-parts iodoform, 300-parts 4-chloro-m-phenylenediamine and either 50-parts tert.-octylamine 50 parts N,N-dimethyl-dodecylamine or 50-parts piperizine as the sole aliphatic amine constituent of the aliphatic/aromatic amine system.

Each of these dry component systems was added to a binder system comprised of 800 parts by dry weight of polyphenylene oxide resin (PPO sold by General Electric Company) and dissolved in chloroform to make a 14-percent solution. Each mixture was stirred until an homogenous composition was obtained and each mixture separately coated as described in example 1 in an amount equivalent to 5 pounds per ream.

After drying the photographically sensitive sheet obtained was exposed and developed as described in example 1 to obtain a high optical density image. Sharp, clearly defined contrast was exhibited between the nearly black image areas and the white background areas.

Other sheets of the coated but unexposed and undeveloped photographic elements were heated at 100° F. in the dark for a period of 10 days. At the end of this time, no discoloration was observed.

In further operations, a photographic medium was prepared substantially as described in the preceding portion of example 2 with the only difference being that a mixture of 100 parts of m-phenylenediamine and 300 parts of 4-chloro-m-phenylenediamine is employed in place of the 4-chloro-m-phenylenediamine. The medium thus prepared is coated as described above in this example and shown to be stable to heat by the test methods described above.

EXAMPLE 3

In further operations, photographic media A, B and C having the composition set forth in table 1 were prepared and coated on the base stock described in example 1 using the methods of example 1. After the photographic elements were prepared and dried they were placed in an oven at 100° F. for 30 days. At the end of this period, the photographic elements were removed and no discoloration was observed.

TABLE 1

| | 4Chloro-m-Phenylenediamine | Iodoform | DFP | Menthane-diamine | Poly-sulfone |
|---|---|---|---|---|---|
| | Parts by Weight | | | | |
| A | 300 | 400 | 400 | 5 | 800 |
| B | 300 | 400 | 400 | 5 | 1,600 |
| C | 300 | 400 | 400 | 10 | 1,600 |

EXAMPLE 4

In another illustration of the sharp photographic contrast which may be obtained by employment of the stabilizer systems of the present invention, a conventionally coated and supercalendered base sheet was employed. This paper web was of bleached bodystock having a basis weight of 57 pounds per 25×38—500 sheet ream. Upon both surfaces of this web a pigmented surface size containing sufficient water to make a composition of 25 percent solids had been applied by a size press in an amount equal to 3 pounds per ream per side. After drying, a second coating comprised by dry weight of 100 parts No. 1 domestic coating clay with 10-parts starch and 5-parts styrene-butadiene latex as a binder was mixed with sufficient water to obtain 60-percent solids and was applied to one surface of the previously coated web in an amount equal to 7 pounds per ream.

The thus coated web having a basis weight of 70 No. ream was dried by conventional means and supercalendered through five nips at 1,500 pli. The web thus obtained was smooth enough to be desirable for photographic quality detailed image reception.

An intermediate, continuous-film coating composition as described in example 1 was applied in an amount equal to 4 No. ream.

The thus coated web was topcoated by means of a No. 20 Mayer bar with 4 pounds per ream of a photographically sensitive coating. This coating was comprised of 1.0-part difurfurylidene pentaerythritol, 0.2-part 4-chloro-m-phenylenediamine, 0.8-part dibromo-toluenediamine, 0.15-part di-n-propylamine and 1.5-part iodoform. As in example 1, these components were mixed under vigorous agitation with 60 parts (wet weight) of a 10-percent solution of polyphenylene oxide in chloroform.

After drying of the coated sheet, exposure was accomplished by the method of example 1. Development was by heating at 350° F. for 40 seconds.

The positive images produced upon this surface were of high optical density in those areas inverse to the colorless portions of the negative original and exhibited excellent contrast between the near-black of the image areas and the white, unyellowed background areas.

The preparation of the aliphatic amine compounds is well known in the art and the primary aromatic amine compounds are known in the art and their preparation described in the patents and application hereby incorporated by reference.

I claim:

1. In a photographic plate comprising, on a support, a layer of a resinous binder containing a furfurylidene derivative color-former, a primary aromatic amine enhancer system and a lower haloalkane sensitizer, the improvement comprising the addition of one or more aliphatic amines taken from the group consisting of menthanediamine, primary, secondary or tertiary aliphatic amines containing at least six carbon atoms, cyclic aliphatic amines and cyclic aliphatic amines containing two ring nitrogen atoms, the aliphatic amine content comprising 0.5 to 15 percent by weight of the total amine content, the resinuous binder being employed in a weight ratio of from 2.5 to 10 with respect to the total amine content, the weight ratio of the total amine content to the color-former being in the range of 0.1 to 10, the weight ratio of haloalkane sensitizer to color-former being in the range of 0.1 to 20 and the weight ratio of resinous binder to color-former being in the range of 1 to 40.

2. The photographic plate claimed in claim 1 wherein the furfurylidene derivative is difurfurylidene pentaerythritol.

3. The photographic plate according to claim 1 wherein the resinous binder is polyphenylene oxide, polysulfone or polystyrene.

4. The photographic plate claimed in claim 3 wherein the resinous binder is polyphenylene oxide, the primary aromatic amine is 4-chloro-m-phenylenediamine and the aliphatic amine is menthanediamine.

5. The photographic plate claimed in claim 1 wherein the primary aromatic amine is 4-chloro-m-phenylenediamine and the aliphatic amine is taken from the group consisting of tert.-octylamine, N,N-dimethyldodecylamine, piperizine and di-n-propylamine.

6. The photographic plate claimed in claim wherein the primary aromatic amine is 4-chloro-m-phenylenediamine and the aliphatic amine is menthanediamine.

7. The photographic plate claimed in claim 1 wherein the primary aromatic amine enhancer is a mixture of 4-chloro-m-phenylenediamine and m-phenylenediamine and the aliphatic amine is menthanediamine.

* * * * *

UNITED STATES PATENT OFFICE
CERTIFICATE OF CORRECTION

Patent No. 3,637,390                    Dated January 25, 1972

Inventor(s) John O. H. Peterson

It is certified that error appears in the above-identified patent and that said Letters Patent are hereby corrected as shown below:

Column 5, line 46, change "0.5" to -- 15 --;

Column 7, line 5, change "stabilizer" to -- enhancer --;
         line 20, change "No." to -- pounds per --; and
         line 27, change "No." to -- pounds per --.

Column 8, line 37, after "claim" insert -- 1 --.

Signed and sealed this 26th day of December 1972.

(SEAL)
Attest:

EDWARD M. FLETCHER, JR.                ROBERT GOTTSCHALK
Attesting Officer                      Commissioner of Patents